(12) United States Patent
Takenaga et al.

(10) Patent No.: US 10,663,653 B2
(45) Date of Patent: May 26, 2020

(54) MULTICORE FIBER FOR COMMUNICATION

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Katsuhiro Takenaga, Sakura (JP); Shoichiro Matsuo, Sakura (JP); Yusuke Sasaki, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

(*) Notice: Subject to any disclaimer, the term of this patent is extended or adjusted under 35 U.S.C. 154(b) by 0 days.

(21) Appl. No.: 16/174,841

(22) Filed: Oct. 30, 2018

(65) Prior Publication Data

US 2019/0072712 A1    Mar. 7, 2019

Related U.S. Application Data

(60) Division of application No. 15/142,246, filed on Apr. 29, 2016, now Pat. No. 10,156,674, which is a
(Continued)

(30) Foreign Application Priority Data

Sep. 5, 2011    (JP) .................................. 2011-193403

(51) Int. Cl.
*G02B 6/02*        (2006.01)
*G02B 6/036*       (2006.01)

(52) U.S. Cl.
CPC ..... *G02B 6/02042* (2013.01); *G02B 6/02014* (2013.01); *G02B 6/02019* (2013.01);
(Continued)

(58) Field of Classification Search
CPC ....................................................... G02B 6/42
(Continued)

(56) References Cited

U.S. PATENT DOCUMENTS 4,295,739 A * 10/1981 Meltz ...................... G01B 11/18
                                                     356/32
4,709,155 A * 11/1987 Yamaguchi ............. F23N 5/082
                                                     250/554

(Continued)

FOREIGN PATENT DOCUMENTS

CN         1950736 A      4/2007
CN       101122653 A      2/2008
(Continued)

OTHER PUBLICATIONS

Office Action dated Mar. 12, 2019, issued in counterpart CN Application No. 201710691101.1, with English translation. (14 pages).
(Continued)

*Primary Examiner* — Kaveh C Kianni
(74) *Attorney, Agent, or Firm* — Westerman, Hattori, Daniels & Adrian, LLP

(57) ABSTRACT

A multicore fiber for communication 10 which allows propagation of an optical signal includes: a clad 12; a core 11a which is arranged in a center of the clad 12; and seven to ten cores 11b which are arranged at equal intervals surrounding the core 11a, and the cladding diameter is 230 μm, distances between centers of the mutually neighboring cores 11a and 11b are 30 μm or more, distances between the centers of the cores 11b and an outer peripheral surface of the clad 12 are
(Continued)

35 μm or more and a mode field diameter of light propagating in the cores 11a and 11b is 9 μm to 13 μm.

8 Claims, 7 Drawing Sheets

Related U.S. Application Data division of application No. 14/194,187, filed on Feb. 28, 2014, now abandoned, which is a continuation of application No. PCT/JP2012/072510, filed on Sep. 4, 2012.

(52) U.S. Cl.
CPC ...... *G02B 6/02366* (2013.01); *G02B 6/02395* (2013.01); *G02B 6/0365* (2013.01)

(58) Field of Classification Search
USPC .......................................................... 385/92
See application file for complete search history.

(56) References Cited

U.S. PATENT DOCUMENTS

| | | | | |
|---|---|---|---|---|
| 4,787,702 A * | 11/1988 | Khalil | G02B 6/441 | 385/102 |
| 5,155,790 A * | 10/1992 | Hwang | G02B 6/06 | 355/1 |
| 5,215,489 A * | 6/1993 | Nakamura | G02B 6/4292 | 385/119 |
| 5,290,280 A * | 3/1994 | Daikuzono | A61B 18/22 | 606/16 |
| 5,454,057 A * | 9/1995 | Arima | G02B 6/2835 | 385/43 |
| 5,703,987 A * | 12/1997 | Imoto | C03B 37/01222 | 385/123 |
| 5,748,820 A * | 5/1998 | Le Marer | G02B 6/02042 | 385/76 |
| 5,944,867 A * | 8/1999 | Chesnoy | C03B 37/027 | 65/408 |
| 6,031,850 A * | 2/2000 | Cheo | H01S 3/094003 | 372/6 |
| 6,078,716 A * | 6/2000 | Huang | G02B 6/02042 | 385/123 |
| 6,212,305 B1 * | 4/2001 | Pan | G02B 6/2746 | 385/11 |
| 6,272,155 B1 * | 8/2001 | Sekiguchi | G02B 6/06 | 372/6 |
| 6,374,009 B1 * | 4/2002 | Chang | G02B 6/2552 | 385/16 |
| 6,453,084 B1 * | 9/2002 | Stanford | G02B 6/3588 | 385/18 |
| 6,542,675 B1 * | 4/2003 | Tourgee | G02B 6/2552 | 385/115 |
| 6,892,011 B2 * | 5/2005 | Walker | B29D 11/00663 | 385/115 |
| 7,027,699 B2 * | 4/2006 | Tao | B29D 11/00721 | 385/126 |
| 7,102,700 B1 | 9/2006 | Pease et al. | | |
| 7,174,078 B2 | 2/2007 | Libori et al. | | |
| 7,242,827 B1 * | 7/2007 | Bochove | G02B 6/02042 | 385/15 |
| 8,649,646 B2 * | 2/2014 | Solarz | G01N 21/8806 | 250/504 R |
| 8,655,131 B2 | 2/2014 | Sasaoka | | |
| 2002/0017667 A1 | 2/2002 | Kumar et al. | | |
| 2002/0024727 A1 * | 2/2002 | Wilcox | H01S 3/067 | 359/342 |
| 2002/0054725 A1 * | 5/2002 | Ivtsenkov | G02F 1/33 | 385/7 |
| 2002/0081067 A1 * | 6/2002 | Brun | G02B 6/29364 | 385/34 |
| 2002/0176677 A1 * | 11/2002 | Kumar | C03B 37/01222 | 385/126 |
| 2002/0180869 A1 * | 12/2002 | Callison | H04N 9/3129 | 348/203 |
| 2003/0063832 A1 * | 4/2003 | Hellman | G02B 6/2706 | 385/11 |
| 2004/0208440 A1 * | 10/2004 | Tateiwa | G02B 6/32 | 385/33 |
| 2004/0264513 A1 * | 12/2004 | Shima | C03C 13/04 | 372/6 |
| 2005/0013573 A1 * | 1/2005 | Lochkovic | G02B 6/4402 | 385/128 |
| 2005/0069269 A1 * | 3/2005 | Libori | G02B 6/02042 | 385/125 |
| 2005/0100282 A1 * | 5/2005 | Okada | G02B 6/2808 | 385/46 |
| 2007/0078500 A1 * | 4/2007 | Ryan | A61B 5/0066 | 607/88 |
| 2007/0154153 A1 * | 7/2007 | Fomitchov | G02B 6/06 | 385/115 |
| 2007/0274639 A1 * | 11/2007 | Shibayama | B41J 2/46 | 385/49 |
| 2008/0069504 A1 * | 3/2008 | Hiraga | G02B 6/403 | 385/106 |
| 2008/0245980 A1 * | 10/2008 | Diatzikis | F01D 21/003 | 250/559.08 |
| 2009/0003764 A1 * | 1/2009 | Ridder | A61B 5/14546 | 385/14 |
| 2009/0324242 A1 * | 12/2009 | Imamura | G02B 6/02042 | 398/142 |
| 2010/0177792 A1 | 7/2010 | Takenaga | | |
| 2010/0183271 A1 * | 7/2010 | Smith | H01J 43/246 | 385/120 |
| 2010/0195965 A1 * | 8/2010 | Sasaoka | G02B 6/02042 | 385/126 |
| 2011/0052129 A1 * | 3/2011 | Sasaoka | G02B 6/02042 | 385/126 |
| 2011/0188855 A1 * | 8/2011 | Kokubun | G02B 6/02042 | 398/43 |
| 2011/0206330 A1 * | 8/2011 | Sasaoka | G02B 6/02042 | 385/126 |
| 2011/0222828 A1 * | 9/2011 | Sasaoka | G02B 6/02042 | 385/127 |
| 2011/0235983 A1 | 9/2011 | Hayashi et al. | | |
| 2011/0249940 A1 * | 10/2011 | Sasaoka | G02B 6/02042 | 385/39 |
| 2011/0274398 A1 * | 11/2011 | Fini | G02B 6/02042 | 385/124 |
| 2011/0274435 A1 * | 11/2011 | Fini | G02B 6/02042 | 398/139 |
| 2012/0014639 A1 * | 1/2012 | Doany | G02B 6/02042 | 385/14 |
| 2012/0087619 A1 * | 4/2012 | Rogers | G01L 1/243 | 385/13 |
| 2012/0087626 A1 * | 4/2012 | Nagashima | G02B 6/02042 | 385/124 |
| 2012/0155805 A1 * | 6/2012 | Doerr | G02B 6/29323 | 385/37 |
| 2012/0155806 A1 * | 6/2012 | Doerr | G02B 6/29323 | 385/37 |
| 2012/0163801 A1 | 6/2012 | Takenaga et al. | | |
| 2012/0195563 A1 * | 8/2012 | Takenaga | G02B 6/02042 | 385/126 |
| 2012/0219254 A1 * | 8/2012 | Bradley | G02B 6/3885 | 385/78 |
| 2013/0195411 A1 * | 8/2013 | Nagashima | G02B 6/02042 | 385/126 |
| 2013/0259429 A1 * | 10/2013 | Czosnowski | G02B 6/3885 | 385/78 |
| 2013/0308913 A1 * | 11/2013 | Tanigawa | G02B 6/02042 | 385/126 |

(56) References Cited

U.S. PATENT DOCUMENTS

| | | | |
|---|---|---|---|
| 2014/0010507 A1* | 1/2014 | Sasaki | G02B 6/02042 385/126 |
| 2014/0036351 A1* | 2/2014 | Fini | G02B 6/2856 359/341.31 |
| 2014/0119694 A1* | 5/2014 | Abedin | G02B 6/02042 385/43 |

FOREIGN PATENT DOCUMENTS

| | | |
|---|---|---|
| CN | 101122654 A | 2/2008 |
| CN | 101910895 A | 12/2010 |
| CN | 102096147 A | 6/2011 |
| CN | 102135639 A | 7/2011 |
| CN | 102169217 A | 8/2011 |
| CN | 102221730 A | 10/2011 |
| CN | 103415795 A | 11/2013 |
| JP | 50-34549 A | 4/1975 |
| JP | 2011-018013 A | 1/2011 |
| JP | 2011-79699 A | 4/2011 |
| JP | 2011-170062 A | 9/2011 |
| JP | 2011-237782 A | 11/2011 |
| JP | 2012-123247 A | 6/2012 |
| WO | 2010/082656 A1 | 7/2010 |
| WO | 2011/004836 A1 | 1/2011 |
| WO | 2011/024808 A1 | 3/2011 |
| WO | 2012/118132 A1 | 9/2012 |

OTHER PUBLICATIONS

International Search Report dated Oct. 9, 2012 issued in corresponding application No. PCT/JP2012/072510.

Koshiba et al., "Heterogeneous multi-core fibers: proposal and design principle" IEICE Electronics Express, vol. 6, No. 2, pp. 98-103, cited in the Specification.

Saitoh et al., "Multi-Core Hole-Assisted Fibers for High Core Density Space Division Multiplexing", 15th OptoElectronics and Communications Conference (OECC2010) Technical Digest, Jul. 2010, pp. 164-165, cited in Ihe ISR.

Saitoh et al., "Multi-Core Hole-Assisted Fibers for High Core Density SDM", The Institute of Electronics, Information and Communication Engineers Sogo Taikai Koen Ronbunshu, Mar. 2010, p. 523, cited in the ISR.

Office Action dated Jan. 25, 2016, issued in counterpart Chinese Patent Application No. 201280042994.2, with English translation. (23 pages).

Office Action dated Feb. 2, 2016, issued in counterpart Japanese Patent Application No. 2015-077966, with English translation. (8 pages).

U.S. Office Action (Restriction and Election of Species Requirements) dated Jun. 27, 2014, issued in U.S. Appl. No. 14/194,184.

U.S. Non-Final Office Action dated Oct. 1, 2014, issued in U.S. Appl. No. 14/194,184.

U.S. Final Office Action dated Mar. 6, 2015, issued in U.S. Appl. No. 14/194,184.

U.S. Non-Final Office Action dated Jul. 16, 2015, issued in U.S. Appl. No. 14/194,184.

U.S. Final Action dated Dec. 9, 2015, issued in U.S. Appl. No. 14/194,184.

Non-Final Office Action dated Nov. 14, 2016, issued in U.S. Appl. No. 15/141,945 (26 pages).

Final Office Action dated Apr. 21, 2017, issued in counterpart U.S. Appl. No. 15/141,945 (11 pages).

Applicant-Initiated Interview dated May 5, 2017, issued in counterpart U.S. Appl. No. 15/141,945 (3 pages).

Office Action dated May 4, 2017, issued in counterpart Chinese Application No. 201280042994.2, with English ranslation. (19 pages).

Non-Final Office Action dated Oct. 20, 2017, issued in U.S. Appl. No. 15/141,945 (10 pages).

Notice of Allowance dated Aug. 14, 2018, issued in U.S. Appl. No. 15/142,246 (10 pages).

U.S. Non-Final Office Action dated Nov. 3, 2017, issued in U.S. Appl. No. 15/142,246 (16 pages).

U.S. Final Office Action dated Apr. 13, 2017, issued in U.S. Appl. No. 15/142,246 (12 pages).

U.S. Non-Final Office Action dated Nov. 8, 2016, issued in U.S. Appl. No. 15/142,246 (26 pages).

U.S. Office Action (Election of Species Requirement) dated Jul. 6, 2016, issued in U.S. Appl. No. 15/142,246 (6 pages).

Notice of Allowance dated Apr. 20, 2018, issued in U.S. Appl. No. 15/141,945 (20 pages).

Final Office Action dated Apr. 12, 2018, issued in U.S. Appl. No. 15/142,246.

Applicant-Initiated Interview dated May 4, 2017, issued in counterpart U.S. Appl. No. 15/142,246.

\* cited by examiner

MULTICORE FIBER FOR COMMUNICATION

This application is a divisional of U.S. application Ser. No. 15/142,246 filed on Apr. 29, 2016 which is a divisional of U.S. application Ser. No. 14/194,187 filed on Feb. 28, 2014, which is a continuation of and claims the benefit of priority of the prior International Application No. PCT/JP2012/072510, filed on Sep. 4, 2012, and is based upon and claims the benefits of priority from Japanese Patent Application No. 2011-193403 filed on Sep. 5, 2011, the entire contents of which are incorporated herein by reference.

TECHNICAL FIELD

The present invention relates to a multicore fiber for communication in which more cores can be arranged under conditions that the multicore fiber for communication can be laid while reliability is secured.

BACKGROUND ART

Currently, an optical fiber used for an optical fiber communication system which is generally spreading adopts a structure in which an outer periphery of a core is surrounded by a clad, and an optical signal propagates in this core to transmit information. Further, as the optical communication system spreads in recent years, the amount of information to be transmitted is remarkably increasing. As the amount of information to be transmitted increases, the optical fiber communication system uses several tens to several hundreds of multiple optical fibers to perform long distance optical communication of large capacity.

To reduce the number of optical fibers in such an optical fiber communication system, it is known as disclosed in, for example, following Non-Patent Document 1 that a plurality of signals is transmitted as light propagating in cores using a multicore fiber in which outer peripheries of a plurality of cores are surrounded by a clad.

CITATION LIST

Non Patent Document

Non-Patent Document 1: Masanori KOSHIBA "Heterogeneous multi-core fibers: proposal and design principle" IEICE Electronics Express, Vol. 6, No. 2

SUMMARY OF INVENTION

Objects to be Achieved by the Invention

In recent years, to increase the amount of information to be transmitted, a multicore fiber is demanded which has a greater number of cores than a multicore fiber which is disclosed in Non-Patent Document 1 and in which cores are provided in a 1-6 arrangement (an arrangement in which a core is arranged in the center, and six cores are arranged at equal intervals surrounding the core). As a multicore fiber which has a greater number of cores than the multicore fiber in which the cores are provided in the 1-6 arrangement, Non-Patent Document 1 discloses a multicore fiber in which cores are provided in a 1-6-12 arrangement (an arrangement in which a core is arranged in the center, six cores are arranged at equal intervals surrounding this core, and twelve cores are further arranged at equal intervals surrounding these six cores). However, the multicore fiber in which the cores are provided in the 1-6-12 arrangement has a concern that distances between the outer peripheral surface of the clad and the cores are too close and, in this case, microbend loss is likely to occur, and therefore reliability of the multicore fiber decreases.

Hence, distances between cores may be increased by increasing a cladding diameter of a multicore fiber. However, when the cladding diameter is increased too much, if the multicore fiber is bent and laid, the multicore fiber is easily fractured and reliability decreases in some cases.

It is therefore an object of the present invention to provide a multicore fiber for communication in which more cores can be arranged under conditions that the multicore fiber for communication can be laid while reliability is secured.

Means for Achieving the Objects

Conventionally, an allowable minimum bend radius of an optical fiber for transmitting an optical signal is 30 mm or more from the view point of bend loss characteristics. Meanwhile, in recent years, a fiber is being developed which causes little loss of light (bend loss) due to a bend, causes no bend loss even when the bend radius is 15 mm or less and is durable against a bend. However, it is known that, if a long period of time passes in a state where a portion having a small diameter is bent, the optical fiber is fractured due to a slight scratch in silica glass. Hence, the minimum bend radius which an optical fiber which is durable against a bend requires is determined prioritizing conditions based on a view point of reliability over conditions based on a view point of bend loss. Further, as an index for securing reliability of an optical fiber which is durable against a bend, an optical fiber in which a cladding diameter is 125 μm requires a condition that the bend radius be less than 30 mm, and a fracture probability in twenty years is preferably $1.0 \times 10^{-7}$ or less in a state where the bend radius is 15 mm and the number of winding is 100. Meanwhile, a screening level of an optical fiber assumes an elongation strain of 1%. Hence, for an optical fiber in which an cladding diameter is 125 μm or more, the bend radius which is conventionally employed is used and the above condition that the number of winding is 100 which is the condition of the optical fiber in which the cladding diameter is 125 μm is used, and, as long as the fracture probability in twenty years is $1.0 \times 10^{-7}$ or less in a state where the bend radius is 30 mm and the number of winding is 100, it is possible to secure sufficient reliability for a communication optical fiber. Further, the inventors of the present invention found that the cladding diameter needs to be 230 μm or less to satisfy the condition that the fracture probability in twenty years is $1.0 \times 10^{-7}$ or less in the state where the bend radius is 30 mm and the number of winding is 100. Hence, the inventors of the present invention made diligent study to arrange more cores in a clad which has such an outer shape, and made the present invention.

That is, an aspect of the present invention includes: a clad; a core which is arranged in a center of the clad; and seven to twelve cores which are each arranged at equal distances from the center and at equal intervals surrounding the core, and an cladding diameter is 230 μm or less.

According to this multicore fiber for communication, the cladding diameter is 230 μm or less, so that it is possible to secure reliability for fracture caused when the multicore fiber for communication is laid. Compared to an optical fiber in which cores are provided in a 1-6-12 arrangement, it is possible to increase distances between outermost periphery side cores and an outer peripheral surface of the clad when the distances between cores are the same as those of this multicore fiber. Consequently, it is possible to suppress microbend loss, and secure reliability.

Further, while, in a multicore fiber in which cores are provided in a 1-6 arrangement, a core which is arranged in the center and two mutually neighboring cores which are arranged on an outer side form a regular triangle, the present invention has seven or more the outer periphery side cores, so that the core which is arranged in the center and two mutually neighboring cores are arranged on the outer side form an isosceles triangle. Hence, distances between centers of the center core and the outer periphery side cores are greater than the distances between the centers of the mutually neighboring outer periphery side cores. When the distances between the cores increase, crosstalk decreases, and crosstalk between the center core and the outer periphery side cores is less than crosstalk between the outer periphery side cores. Hence, when optical signals enter all cores, although a center core having a greater number of the closest cores includes a greater total sum of crosstalk, it is possible to suppress a total sum of crosstalk of the center core according to the relationship.

Further, even though such a multicore fiber for communication can transmit optical signals in this way without deteriorating the optical signals, eight or more cores are arranged therein, so that it is possible to arrange more cores and transmit a greater amount of information than a conventional common multicore fiber in which cores are provided in the 1-6 arrangement.

Furthermore, another aspect of the present invention includes: a clad; three cores which are each arranged at equal distances from a center of the clad and at equal intervals; and five to twelve cores which are each arranged at equal distances from the center and at equal intervals surrounding the core, and an cladding diameter is 230 μm or less.

Eight or more cores are also arranged according to such a core arrangement, so that it is possible to arrange more cores and transmit a greater amount of information than a conventional common multicore fiber in which cores are provided in the 1-6 arrangement. Further, compared to the multicore fiber in which the cores are provided in the 1-6-12 arrangement, it is possible to suppress microbend loss more and secure reliability when the distances between the cores are the same as those of this multicore fiber.

Furthermore, still another aspect of the present invention is a multicore fiber for communication which allows propagation of an optical signal, and includes: a clad; a core which is arranged in a center of the clad; and six cores which are each arranged at equal distances from the center and at equal intervals surrounding the core; and one to six cores which are arranged between a connection line which connects two mutually neighboring cores of the six cores and the core, and on the line which is vertical to the connection line and passes on the core, and an cladding diameter is 230 μm or less.

According to such a multicore fiber for communication, the cores are arranged in three layers, and one to six cores are arranged in the second layer. That is, the cores are arranged in a 1-6-6 arrangement from the 1-1-6 arrangement. Consequently, eight to thirteen cores are arranged as a whole, so that it is possible to arrange more cores and transmit a greater amount of information than the conventional common multicore fiber in which cores are provided in a 1-6 arrangement. Further, compared to the multicore fiber in which the cores are provided in the 1-6-12 arrangement, it is possible to suppress microbend loss more and secure reliability when the distances between the cores are the same as those of this multicore fiber.

Furthermore, another aspect of the present invention includes: a clad; a core which is arranged in a center of the clad; and eight cores which surround the core and are arranged at equal intervals to form a square shape as a whole, and an cladding diameter is 230 μm or less.

According to such a core arrangement, it is also possible to arrange more cores and transmit a greater amount of information than a conventional common multicore fiber in which cores are provided in the 1-6 arrangement. Further, compared to the multicore fiber in which the cores are provided in the 1-6-12 arrangement, it is possible to suppress microbend loss more and secure reliability when the distances between the cores are the same as those of this multicore fiber.

Furthermore, still another aspect of the present invention includes: a clad; four cores which are each arranged at equal distances from a center of the clad and at equal intervals; and eight cores which are arranged on an extended line which connects two mutually neighboring cores of the four cores, and which are arranged such that distances to a center of a closest core of the four cores are equal to distances between centers of the two mutually neighboring cores of the four cores, and an cladding diameter is 230 μm or less.

According to such a core arrangement, it is also possible to arrange more cores and transmit a greater amount of information than a conventional common multicore fiber in which cores are provided in the 1-6 arrangement. Further, compared to the multicore fiber in which the cores are provided in the 1-6-12 arrangement, it is possible to suppress microbend loss more and secure reliability when the distances between the cores are the same as those of this multicore fiber.

Furthermore, in any one of the invention, a mode field diameter of light propagating in each of the cores is 9 μm to 13 μm, and a distance between centers of the cores which are mutually neighboring is 30 μm or more, and a distance between the center of the core and an outer peripheral surface of the clad is preferably 35 μm or more.

When information is transmitted using the multicore fiber, the mode field diameter is about 9 μm to 13 μm, so that it is possible to suppress loss of an optical signal. This is because the mode field diameter is 9 μm or more, so that it is possible to prevent loss of light from increasing due to a non-linear optical effect because of concentration of light on cores, and the mode field diameter is 13 μm or less, so that it is possible to prevent loss of light from increasing due to an increase of the amount of light leaking to an outside of the cores. Further, the mode field diameter is to 9 μm to 13 μm and the distance between the centers of the mutually neighboring cores is 30 μm or more, so that it is possible to suppress crosstalk. Furthermore, the mode field diameter is 9 μm to 13 μm and the distance between the center of the core and the outer peripheral surface of the clad is 35 μm or more, so that it is possible to prevent loss of an optical signal due to absorption of light in a protective layer which covers the clad.

Still further, the invention preferably includes: an inner clad layer which has a lower refractive index than that of the core and which surrounds the core; and a low refractive index layer which has a lower average refractive index than those of the clad and the inner clad layer and which surrounds the inner clad layer. Each low refractive index layer surrounds each core across the inner clad layer, so that an effect of light confinement in each core is great and light hardly leaks from the cores. Consequently, it is possible to reduce crosstalk between the cores.

Further, in the invention, the low refractive index layer is made of a material having a lower refractive index than those of the clad and the inner clad layer. As to the refractive index of such a low refractive index layer, when each core element is viewed from the view point of the refractive index, the low refractive index layer has a trench shape which is referred to a "trench structure". Such a structure is adopted, so that it is possible to suppress loss resulting from a bend of a fiber more, and a manufacturing method for mass production has already been established, so that it is possible to easily manufacture multicore fibers for communication at low cost.

Alternatively, in the above invention, in the low refractive index layer, a plurality of low refractive index portions which has lower refractive indices than those of the clad and the inner clad layer is formed to surround the inner clad layer. In such a low refractive index layer, the low refractive index portions are not continuously formed annularly to surround the cores, so that it is possible to prevent each core from intensifying confinement of a higher mode, and prevent a cutoff wavelength of each core from becoming longer.

Further, the low refractive index portion may be a hole. In this case, it is possible to make the refractive index of the low refractive index layer lower, and further reduce crosstalk while preventing each core from intensifying confinement of a higher mode.

Effect of Invention

As described above, the present invention provides a multicore fiber for communication in which more cores can be arranged under conditions that the multicore fiber for communication can be laid while reliability is secured.

DESCRIPTION OF EMBODIMENTS

Figure 1:
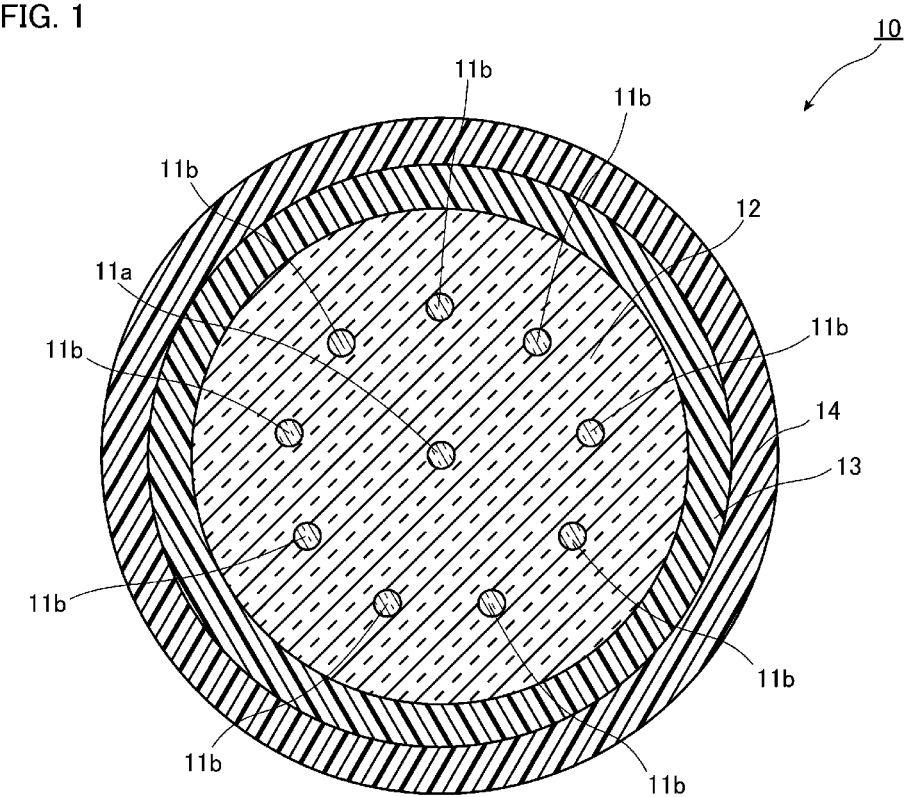
FIG. 1 is a view illustrating a structure of a vertical cross section of a multicore fiber for communication in a longitudinal direction according to a first embodiment of the present invention.

Suitable embodiments of a multicore fiber for communication (referred to as a "multicore fiber" below) according to the present invention will be explained in detail hereinafter referring to the drawings.

First Embodiment

FIG. 1 is a view illustrating a structure of a vertical cross section of a multicore fiber in a longitudinal direction according to a first embodiment of the present invention. As illustrated in FIG. 1, a multicore fiber 10 according to the present embodiment has a clad 12, a core 11a which is arranged in the center in a cross section of the clad 12, nine cores 11b which are arranged at equal intervals surrounding the core 11a, an inner protective layer 13 which covers an outer peripheral surface of the clad 12 and an outer protective layer 14 which covers an outer peripheral surface of the inner protective layer 13. That is, in the multicore fiber 10 according to the present embodiment, a plurality of cores 11a and 11b is provided in a 1-9 arrangement.

This multicore fiber 10 is an optical fiber which allows propagation of an optical signal, and a mode field diameter of light propagating in the cores 11a and 11b is preferably 9 μm to 13 μm. The mode field diameter is 9 μm or more, so that it is possible to prevent loss of light from increasing due to a non-linear optical effect because of concentration of light on cores, and the mode field diameter is 13 μm or less, so that it is possible to prevent loss of light from increasing due to an increase of the amount of light leaking to an outside of the cores.

The clad 12 has a virtually circular shape as an outer shape in the cross section, and surrounds the outer peripheral surfaces of a plurality of cores 11a and 11b without gaps. A material for forming the clad 12 is not limited in particular as long as the material is generally used for a clad, and the material is made of, for example, pure silica glass doped without a dopant.

The respective cores 11a and 11b are preferably arranged such that distances between centers of the mutually neighboring cores 11a and 11b are 30 μm or more and, more preferably, 40 μm or more. The cores 11a and 11b are arranged in this way, so that it is possible to suppress crosstalk between the mutually neighboring cores 11a and 11b. Particularly when the mode field diameter is 9 to 13 μm as described above, it is possible to prevent crosstalk by arranging the cores 11a and 11b in this way. Further, the cores 11b arranged on the outer periphery side are preferably arranged such that distances between the centers of the cores 11b and the outer peripheral surface of the clad 12 are 35 μm or more and, more particularly, 40 μm or more. The cores 11b are arranged on the outer periphery side in this way, so that it is possible to prevent loss of an optical signal caused when light propagating in the core 11b on the outer periphery side is absorbed by the inner protective layer 13.

Further, the respective cores 11b arranged on the outer periphery side are arranged at equal distances from the center of the clad 12 and at equal intervals. The cores 11a and 11b arranged in this way are symmetrical with respect to a center axis of the clad 12. That is, when the multicore fiber 10 is rotated around the center axis of the clad 12 at a predetermined angle, positions of the outer periphery side cores 11b after rotation come to positions of the other outer periphery side cores 11b before rotation. Further, the core 11a arranged in the center does not move even when the multicore fiber 10 is rotated about the center axis. The respective cores 11a and 11b are arranged at positions symmetrical with respect to the center axis of the clad 12 in this way, so that it is possible to make an optical property resulting from the arrangement of the cores 11a and 11b uniform.

Further, the distances between the centers of the center core 11a and the outer side cores 11b are made longer than the distances between the centers of the mutually neighboring outer side cores 11b to draw an isosceles triangle with the core 11a and the two mutually neighboring cores 11b arranged in this way.

Furthermore, the diameters of the respective cores 11a and 11b are not limited in particular and, for example, 8.7 μm to 12 μm. In addition, the diameters of the mutually neighboring cores 11a and 11b are preferably slight different from each other. In this case, for example, the diameters of the cores 11b arranged on the outer periphery side are about 3% different from the diameter of the core 11a arranged in the center, and the diameters of the mutually neighboring cores 11b arranged on the outer periphery side are about 0.5% to 5% different from each other. Thus, although, even when the diameters of the mutually neighboring cores 11a and 11b are physically slightly different, the cores 11a and 11b have only slightly different diameters for light propagating in the cores 11a and 11b and have the substantially same optical characteristics, the diameters of the mutually neighboring cores 11a and 11b are physically slightly different, so that it is possible to prevent crosstalk between the mutually neighboring cores 11a and 11b.

Further, the refractive indices of the cores 11a and 11b are higher than the refractive index of the clad 12, and a relative refractive index difference $\Delta$ with respect to the clad of the respective cores 11a and 11b is not limited in particular and is, for example, 0.21% to 0.5%.

In addition, the refractive indices of mutually neighboring cores of the respective cores 11a and 11b are preferably different from each other from the viewpoint of preventing crosstalk between the respective cores 11a and 11b. In this case, the differences between the refractive indices of the mutually neighboring cores 11a and 11b are preferably 1% to 5% of the refractive indices from the view point of preventing crosstalk and making optical characteristics of the cores equal.

A material of these cores 11a and 11b is not limited in particular as long as the material has the refractive index which is higher than the clad 12 and is the above relative refractive index difference with respect to the clad, and is, for example, silica glass doped with a dopant such as germanium which increases the refractive index.

Further, a material of the inner protective layer 13 and the outer protective layer 14 includes ultraviolet curable resin of different types from each other.

In addition, this multicore fiber 10 can be manufactured by a stack and draw method. That is, a plurality of rod-shaped core glass members which form the cores 11a and 11b, a tubular clad glass member which forms part of the clad 12 and a rod-shaped clad glass member which forms part of the clad 12 are prepared first. Further, the respective core glass members are arranged in penetration holes of the tubular clad glass member, and the rod-shaped clad glass member is arranged between the tubular clad glass member and the core glass members to fill gaps. Furthermore, these members are collapsed in a state where the core glass members are arranged to make a fiber base material in which an arrangement in the cross section has a similar figure without the inner protective layer 13 and the outer protective layer 14 in the multicore fiber 10 illustrated in FIG. 1. Still further, the created fiber base material is heated, melted and spun to make a multicore fiber, and this multicore fiber is covered by the inner protective layer 13 and the outer protective layer 14 to make the multicore fiber 10. Alternatively, the core glass members and the rod-shaped clad glass member may be spun while being collapsed in a state where the core glass members and the rod-shaped clad glass member are arranged in penetration holes of the tubular clad glass member.

Alternatively, in an intermediate base material which has in the center the core glass member which forms the core 11a, penetration holes are made around the core glass member which is the center of the clad glass member, glass rods which have the core glass members are inserted in these penetration holes, and the these glass rods and the clad glass members are collapsed filling the gaps therebetween to make the same fiber base material as the above. Further, the members are spun in the same way as the above and covered by the inner protective layer 13 and the outer protective layer 14 to make the multicore fiber 10. Alternatively, the members may be spun while being collapsed in a state where the above glass rods are inserted in the above penetration holes.

Next, the cladding diameter will be described. Conventionally, an allowable minimum bend radius of an optical fiber for transmitting an optical signal is 30 mm or more from the view point of bend loss characteristics. Meanwhile, in recent years, a fiber is being developed which causes little loss of light (bend loss) due to a bend, causes no bend loss even when the bend radius is 15 mm or less and is durable against a bend. However, it is known that, if a long period of time passes in a state where a portion having a small diameter is bent, the optical fiber is fractured due to a slight scratch in silica glass. Hence, the minimum bend radius which an optical fiber requires is determined prioritizing conditions based on a view point of reliability over conditions based on a viewpoint of bend loss. Further, as an index for securing reliability, an optical fiber in which an cladding diameter is 125 μm requires a condition that the bend radius be less than 30 mm, and a fracture probability in twenty years is preferably $1.0 \times 10^{-7}$ or less in a state where the bend radius is 15 mm and the number of winding is 100. Meanwhile, a screening level of an optical fiber assumes an elongation strain of 1%. Hence, for an optical fiber in which an cladding diameter is 125 μm or more, the bend radius which is conventionally employed is used and the above condition that the number of winding is 100 which is the condition of the optical fiber in which the cladding diameter is 125 μm is used, and, as long as the fracture probability in twenty years is $1.0 \times 10^{-7}$ or less in a state where the bend radius is 30 mm and the number of winding is 100, it is possible to secure sufficient reliability for a communication optical fiber.

Figure 2:
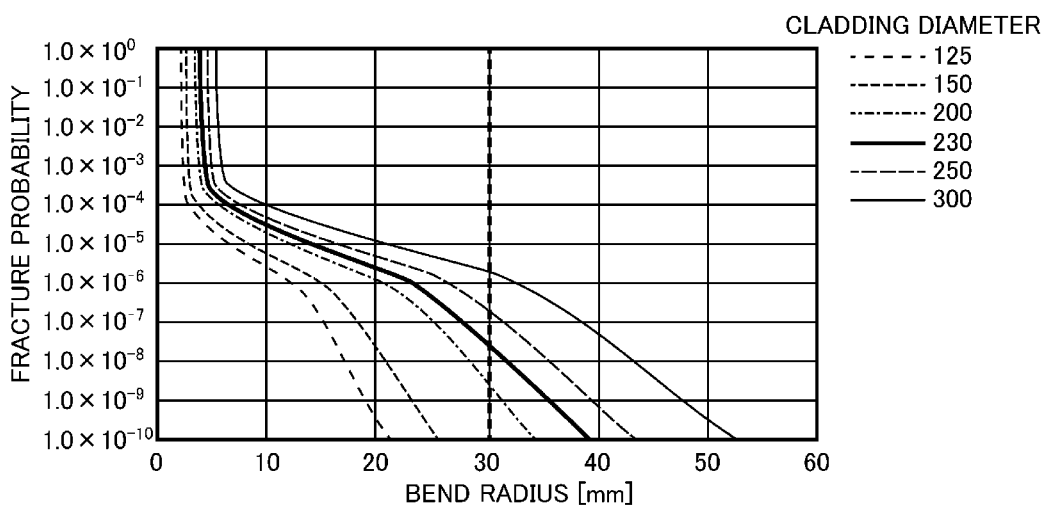
FIG. 2 is a view illustrating a relationship between the bend radius and the failure probability of an optical fiber.

FIG. 2 is a view illustrating a relationship between the bend radius and the fracture probability of an optical fiber.

FIG. 2 illustrates curves illustrating relationships between bend radii and fracture probabilities in twenty years when optical fibers in which cladding diameters are 125 μm, 150 μm, 200 μm, 230 μm, 250 μm and 300 μm are wound a hundred times.

As illustrated in FIG. 2, when the diameter is 230 μm or less, the fracture probability in the twenty years in case that the optical fiber is wound a hundred times is $1.0 \times 10^{-7}$ or less. Hence, to lay the multicore fiber while reliability is secured, the cladding diameter of the multicore fiber 10 is 230 μm or less. Further, when the distances between the centers of the mutually neighboring ores 11a and 11b are 30 μm or more and the distances between the centers of the cores 11b arranged on the outer periphery side and the outer peripheral surface of the clad 12 are 35 μm or more, the cladding diameter is 158 μm to 230 μm in the multicore fiber 10 in which the cores are provided in a 1-9 arrangement as in the present embodiment. Furthermore, when the distances between the centers of the mutually neighboring cores 11a and 11b are 40 μm or more and the distances between the centers of the cores 11b arranged on the outer periphery side and the outer peripheral surface of the clad 12 are 40 μm or more, the cladding diameter is 197 μm to 230 μm in the multicore fiber 10 in which the cores are provided in a 1-9 arrangement as in the present embodiment.

As described above, according to this multicore fiber 10, the cladding diameter is 230 μm or less, so that it is possible to secure reliability for fracture caused when the multicore fiber 10 is laid. Further, compared to an optical fiber in which cores are provided in a 1-6-12 arrangement, it is possible to increase distances between the centers of the outermost periphery side cores 11b and an outer peripheral surface of the clad 12 when the distances between cores are the same as those of this multicore fiber. Consequently, it is possible to suppress microbend loss, and secure reliability.

Further, the multicore fiber 10 has reliability as described above and has 10 cores arranged therein, and, consequently, can transmit a greater amount of information than a conventional common multicore fiber in which cores are provided in a 1-6 arrangement.

Furthermore, while, in a multicore fiber in which cores are provided in the 1-6 arrangement, a core which is arranged in the center and two mutually neighboring cores which are arranged on an outer side form a regular triangle, the multicore fiber 10 according to the present invention has seven or more outer periphery side cores 11b, so that the core 11a arranged in the center and two mutually neighboring cores arranged on the outer side form an isosceles triangle. Hence, distances between the centers of the center core 11a and the outer periphery side cores 11b are greater than the distances between the centers of the mutually neighboring outer periphery side cores 11b. When the distances between the cores increase, crosstalk decreases, and crosstalk between the center core 11a and the outer periphery side cores 11b is less than crosstalk between the outer periphery side cores 11b. Hence, when optical signals enter all cores 11a and 11b, although the center core 11a having a greater number of the closest cores includes a greater total sum of crosstalk, it is possible to suppress a total sum of crosstalk of the center core 11a according to the relationship. It is possible to balance the crosstalk between the cores 11a and 11b of the multicore fiber 10 as a whole.

Further, when the distances between the centers of the mutually neighboring cores 11a and 11b are 30 μm or more, it is possible to reduce crosstalk and, when the distances are 40 μm or more, it is possible to further reduce crosstalk, so that it is possible to secure higher reliability. Furthermore, when the distances between the centers of the cores 11b and the outer peripheral surface of the clad 12 are 35 μm or more, loss of a optical signal caused by absorption of light in inner protective layer 13 can be prevented and, consequently, it is possible to secure reliability for communication and, when the distances are 40 μm or more, it is possible to secure higher reliability.

Figure 3:
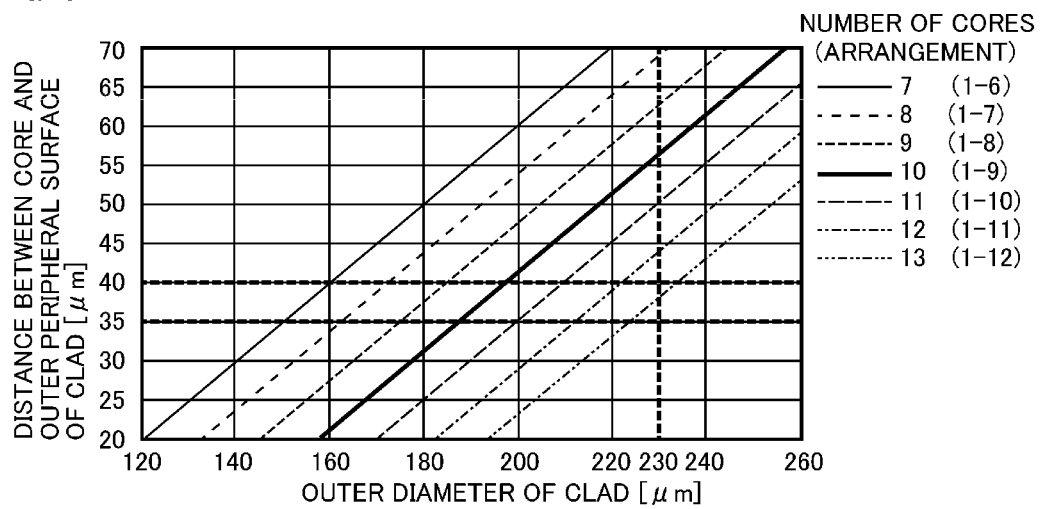
FIG. 3 is a view illustrating a relationship between an cladding diameter and distances between outer periphery side cores and an outer peripheral surface of the clad when one core is arranged in the center and a plurality of cores is arranged around this core.

In addition, although an example has been described with the present embodiment where a core is arranged in the center and nine cores are arranged on an outer periphery side, the number of outer periphery side cores is not limited to this, and the number of cores can be adequately changed as long as the number of cores is greater than that of the conventional common multicore fiber in which the cores are provided in the 1-6 arrangement. FIG. 3 illustrates a relationship between the cladding diameter, and distances between the outer periphery side cores and the outer peripheral surface of the clad when the distances between the mutually neighboring cores are 40 μm in a multicore fiber in which a core is arranged in the center and a plurality of cores is arranged around this core at equal intervals.

As illustrated in FIG. 3, the leftmost line illustrates a relationship between the cladding diameter, and the distances between the centers of the outer periphery side cores 11b and the outer peripheral surface of the clad 12 when the cores 11a and 11b are provided in the 1-6 arrangement. Further, lines right to this line illustrate relationships between the cladding diameter, and the distances between the centers of the outer periphery side cores 11b and the outer peripheral surface of the clad 12 when the cores 11a and 11b are provided in a 1-7 arrangement, a 1-8 arrangement, a 1-9 arrangement, a 1-10 arrangement, a 1-11 arrangement and a 1-12 arrangement in this order.

As described above, the cladding diameter needs to be 230 μm or less from the viewpoint of securing reliability for fracture when the multicore fiber is laid, and the distances between the centers of the cores 11b arranged on the outer periphery side and the outer periphery surface of the clad 12 are preferably 35 μm or more and, more preferably, 40 μm or more from the view point of suppressing loss of a optical signal caused by absorption of light in the inner protective layer 13. In the multicore fiber in which the number of cores is greater than that of the conventional common multicore fiber in which the cores are provided in the 1-6 arrangement, when the core 11a is arranged in the center of the clad 12 and a plurality of cores 11 is arranged on the outer periphery side surrounding this core 11a, to arrange a greater number of cores while reliability is secured for fracture when the multicore fiber is laid, the number of the outer periphery side cores 11b is seven to twelve when the distances between the centers of the cores 11b and the outer periphery surface of the clad 12 are 35 μm or less and the number of the outer periphery side cores 11b is seven to eleven when the distances between the centers of the cores 11b and the outer periphery surface of the clad 12 are 40 μm or less. In addition, when the cores 11a and 11b are provided in the 1-9 arrangement, the lower limit of the cladding diameter can also be calculated from FIG. 3.

Second Embodiment

Next, referring to FIG. 4, a second embodiment of the present invention will be described in detail. In addition, components that are identical or similar to those in the first embodiment will be denoted by the same reference numerals as those used in the first embodiment unless particularly described, and will not be described.

Figure 4:
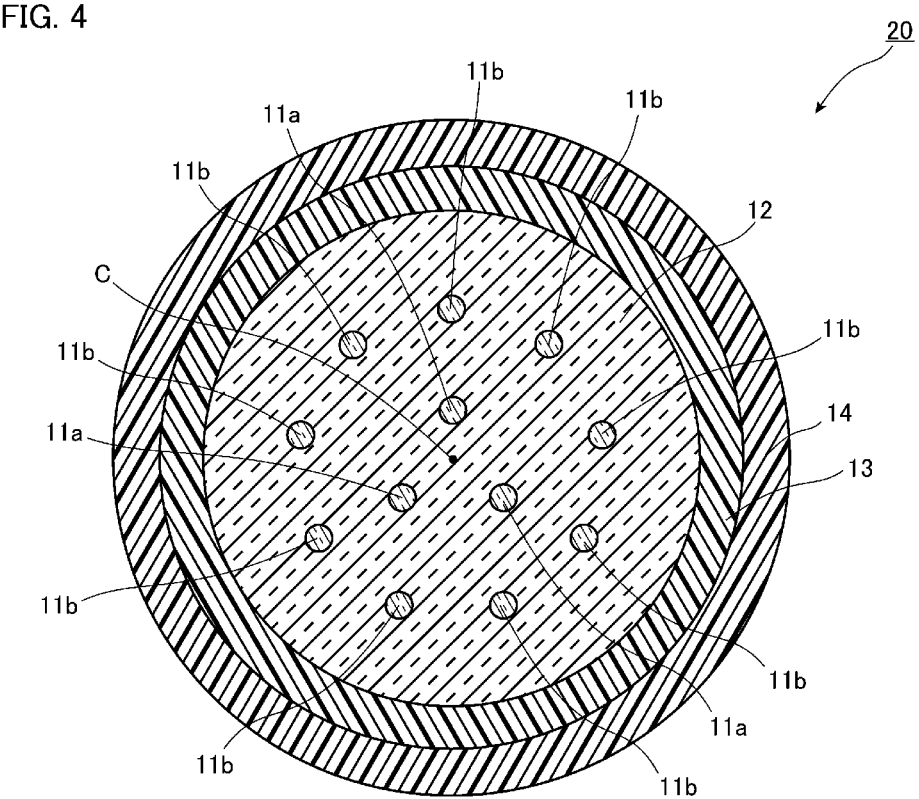
FIG. 4 is a view illustrating a structure of a vertical cross section of a multicore fiber for communication in a longitudinal direction according to a second embodiment of the present invention.

FIG. 4 is a view illustrating a structure of a vertical cross section of a multicore fiber in a longitudinal direction according to the second embodiment of the present invention. As illustrated in FIG. 4, a multicore fiber 20 according to the present embodiment differs from a multicore fiber 10 according to the first embodiment in an arrangement of cores 11a and 11b. More specifically, three cores 11a are arranged at equal intervals surrounding a center C in a cross section of a clad 12, and nine cores 11b are arranged around the center C of the clad 12 surrounding these three cores 11a. That is, in the multicore fiber 20 according to the present embodiment, a plurality of cores 11a and 11b is provided in a 3-9 arrangement.

The multicore fiber 20 according to the present embodiment is an optical fiber which allows propagation of an optical signal similar to the multicore fiber 10 according to the first embodiment, and the mode field diameter of light propagating in the respective cores 11a and 11b is preferably 9 µm to 13 µm for the same reason as for the multicore fiber 10 according to the first embodiment.

Further, for the same reason as for the multicore fiber 10 according to the first embodiment, distances between centers of the respective cores 11a and 11b are preferably 30 µm or more and, more preferably, 40 µm or more. Furthermore, for the same reason as for the multicore fiber 10 according to the first embodiment, distances between the centers of the outer periphery side cores 11b and the outer periphery side of the clad 12 are also preferably 35 µm or more and, more preferably, 40 µm or more.

In the present embodiment, when the distances between the centers of the mutually neighboring cores 11a and 11b are 30 µm or more and the distances between the centers of the cores 11b arranged on the outer periphery side and the outer peripheral surface of the clad 12 are 35 µm or more as described above, the cladding diameter is 165 µm to 230 µm, and, when the distances between the centers of the mutually neighboring cores 11a and 11b are 40 µm or more and the distances between the centers of the cores 11b arranged on the outer periphery side and the outer peripheral surface of the clad 12 are 40 µm or more, the cladding diameter is 207 µm to 230 µm. The reason why the upper limit of the cladding diameter is 230 µm is the same as the reason why the upper limit of the cladding diameter of the multicore fiber 10 according to the first embodiment is 230 µm.

Twelve cores are arranged according to the arrangement of the cores 11a and 11b of the multicore fiber 20 according to the present embodiment, so that it is possible to arrange more cores and transmit a greater amount of information than a conventional common multicore fiber in which cores are provided in a 1-6 arrangement.

In addition, when three cores are arranged surrounding the center C of the clad 12 as in the multicore fiber 20 according to the present embodiment, if the number of outer periphery side cores 11b surrounding these three cores 11a is five or more, it is possible to arrange more cores than the conventional common multicore fiber in which the cores are provided in the 1-6 arrangement. Further, the cladding diameter is 230 µm or less, and therefore the number of the outer periphery side cores 11b is twelve or less. Hence, when the three cores are arranged surrounding the center C of the clad 12, the number of outer periphery side cores is five to twelve. That is, when the three cores are arranged in the center as in the present embodiment, the cores 11a and 11b are provided in a 3-5 arrangement to a 3-12 arrangement to arrange more cores while reliability is secured for fracture when the multicore fiber is laid.

Third Embodiment

Next, referring to FIG. 5, a third embodiment of the present invention will be described in detail. In addition, components that are identical or similar to those in the first embodiment will be denoted by the same reference numerals as those used in the first embodiment unless particularly described, and will not be described.

Figure 5:
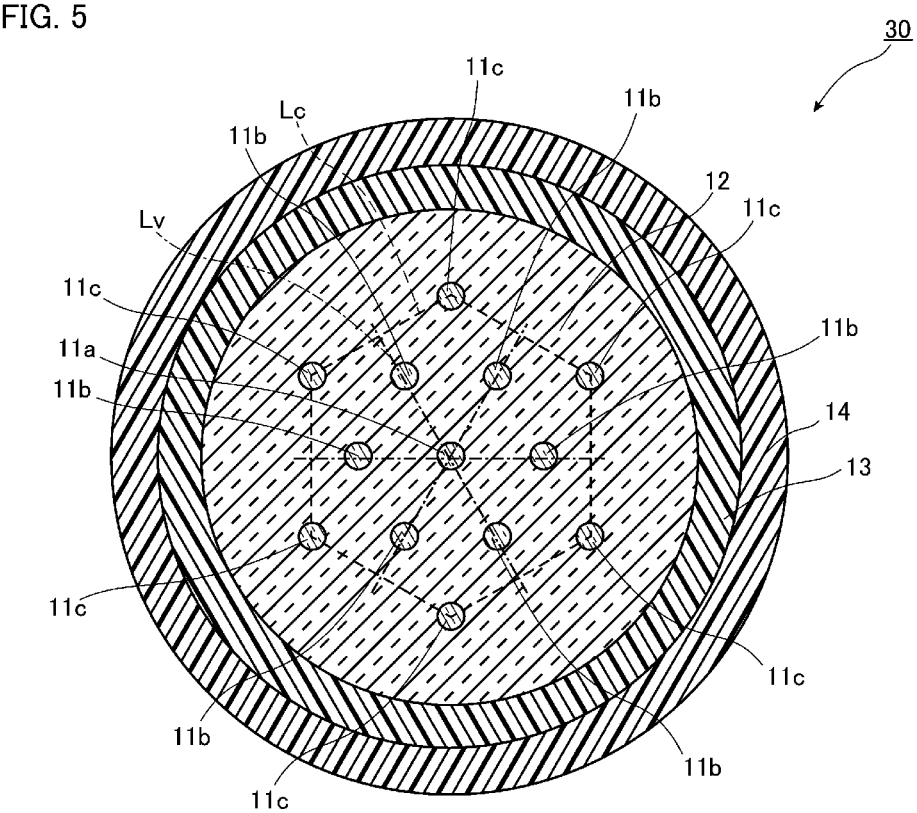
FIG. 5 is a view illustrating a structure of a vertical cross section of a multicore fiber for communication in a longitudinal direction according to a third embodiment of the present invention.

FIG. 5 is a view illustrating a structure of a vertical cross section of a multicore fiber in a longitudinal direction according to a third embodiment of the present invention. As illustrated in FIG. 5, a multicore fiber 30 according to the present embodiment differs from a multicore fiber 10 according to the first embodiment in a core 11a arranged in the center, a plurality of cores 11b and, in addition, a plurality of cores 11c arranged on an outermost periphery side. More specifically, the core 11a is arranged in the center in the cross section of a clad 12, the outermost periphery side six cores 11c are arranged at equal intervals surrounding this core 11a, and, between connection lines Lc (indicated by broken lines in FIG. 5) which connect the two mutually neighboring cores 11c of the six cores 11c and the core 11a arranged in the center of the clad 12, the cores 11b are arranged on lines Lv (indicated by dashed lines in FIG. 5) which are vertical to the connection lines Lc and pass on the core 11a. Hence, the six cores 11b are arranged. That is, in the multicore fiber 30 according to the present embodiment, a plurality of cores 11a, 11b and 11c is provided in a 1-6-6 arrangement. In addition, in the present embodiment, the respective cores 11a, 11b and 11c are arranged to form a triangular grid.

The multicore fiber 30 according to the present embodiment is an optical fiber which allows propagation of an optical signal similar to the multicore fiber 10 according to the first embodiment, and the mode field diameter of light propagating in the respective cores 11a, 11b and 11c is preferably 9 µm to 13 µm for the same reason as for the multicore fiber 10 according to the first embodiment.

Further, for the same reason as for the multicore fiber 10 according to the first embodiment, distances between centers of the respective cores 11a, 11b and 11c are preferably 30 µm or more and, more preferably, 40 µm or more. Furthermore, for the same reason as for the multicore fiber 10 according to the first embodiment, distances between the centers of the outer periphery side cores 11c and the outer periphery side of the clad 12 are also preferably 35 µm or more and, more preferably, 40 µm or more.

Figure 6:
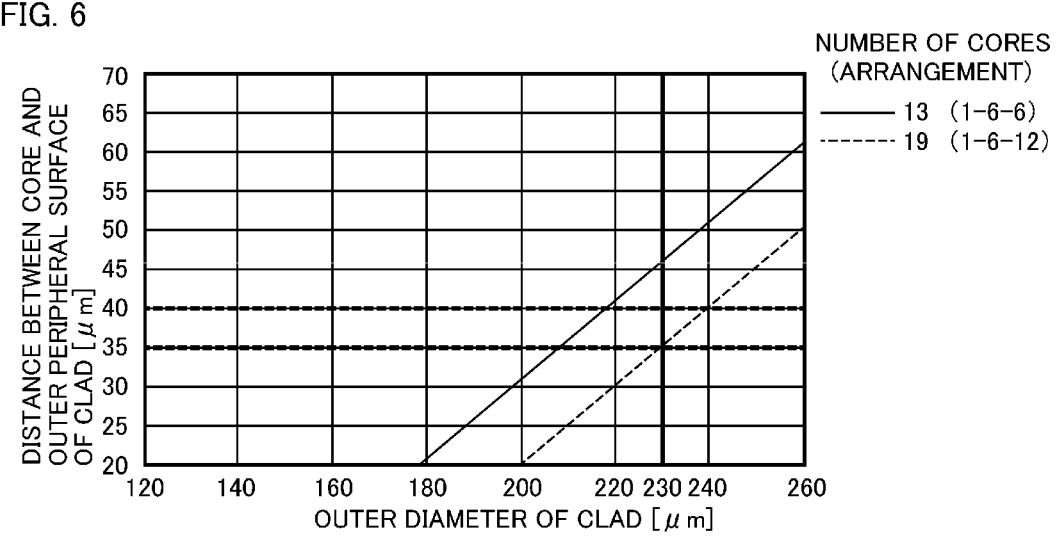
FIG. 6 is a view illustrating a relationship between an cladding diameter and distances between outer periphery side cores and an outer peripheral surface of the clad when one core is arranged in the center, six cores are arranged around this core and a plurality of cores is arranged around these six cores at equal intervals.

FIG. 6 is a view illustrating a relationship between an cladding diameter and distances between outer periphery side cores and an outer peripheral surface of the clad when one core is arranged in the center, six cores are arranged around this core and a plurality of cores is arranged around these six cores at equal intervals, and when the distances between the centers of the mutually neighboring cores are 40 µm. In FIG. 6, a left side line indicates a relationship between the cladding diameter and the distances between the outer periphery side cores and the outer peripheral surface of the clad in case of a 1-6-6 arrangement similar to the present embodiment, and a right side line indicates a relationship between the cladding diameter and the distances between the outer periphery side cores and the outer peripheral surface of the clad in case of a 1-6-12 arrangement. As illustrated in FIG. 6, as long as the cores are provided in a 1-6-6 arrangement as in the present embodiment, a line is positioned in an area in which the cladding diameter is 230 μm or less and the distances between the centers of the cores 11c arranged on the outer periphery side and the outer peripheral surface of the clad 12 are 40 μm or more. Meanwhile, according to the 1-6-12 arrangement, the line is not positioned in this area, and such an arrangement cannot be adopted.

In the present embodiment, when the distances between the centers of the mutually neighboring cores 11a, 11b and 11c are 30 μm or more and the distances between the centers of the cores 11b arranged on the outer periphery side and the outer peripheral surface of the clad 12 are 35 μm or more as described above, the cladding diameter is 174 μm to 230 μm, and, when the distances between the centers of the mutually neighboring cores 11a and 11b are 40 μm or more and the distances between the centers of the cores 11b arranged on the outer periphery side and the outer peripheral surface of the clad 12 are 40 μm or more, the cladding diameter is 219 μm to 230 μm as illustrated in FIG. 6. In addition, the reason why the upper limit of the cladding diameter is 230 μm is the same as the reason why the upper limit of the cladding diameter of the multicore fiber 10 according to the first embodiment is 230 μm.

Thirteen cores are arranged according to the arrangement of the cores 11a, 11b and 11c of the multicore fiber 30 according to the present embodiment, so that it is possible to arrange more cores and transmit a greater amount of information than a conventional common multicore fiber in which cores are provided in the 1-6 arrangement.

Further, although an example has been described with the present embodiment where the number of cores 11b is six, the number of cores 11b can be one to six. Hence, the core 11a is arranged in the center of the clad 12, the six cores 11c are arranged at equal intervals surrounding this core 11a and, between the connection lines Lc connecting the two mutually neighboring cores 11c of these six cores 11c and the core 11a arranged in the center of the clad 12, at least one core 11b may be arranged on the line Lv which is vertical to the connection line Lc and passes on the core 11a arranged in the center of the clad 12. That is, when the core is arranged in the center as in the present embodiment and cores are arranged in three layers as a whole, the cores 11a, 11b and 11c are provided in a 1-1-6 arrangement to a 1-6-6 arrangement to arrange more cores while reliability is secured for fracture when the multicore fiber is laid.

Fourth Embodiment

Next, referring to FIG. 7, a fourth embodiment of the present invention will be described in detail. In addition, components that are identical or similar to those in the first embodiment will be denoted by the same reference numerals as those used in the first embodiment unless particularly described, and will not be described.

Figure 7:
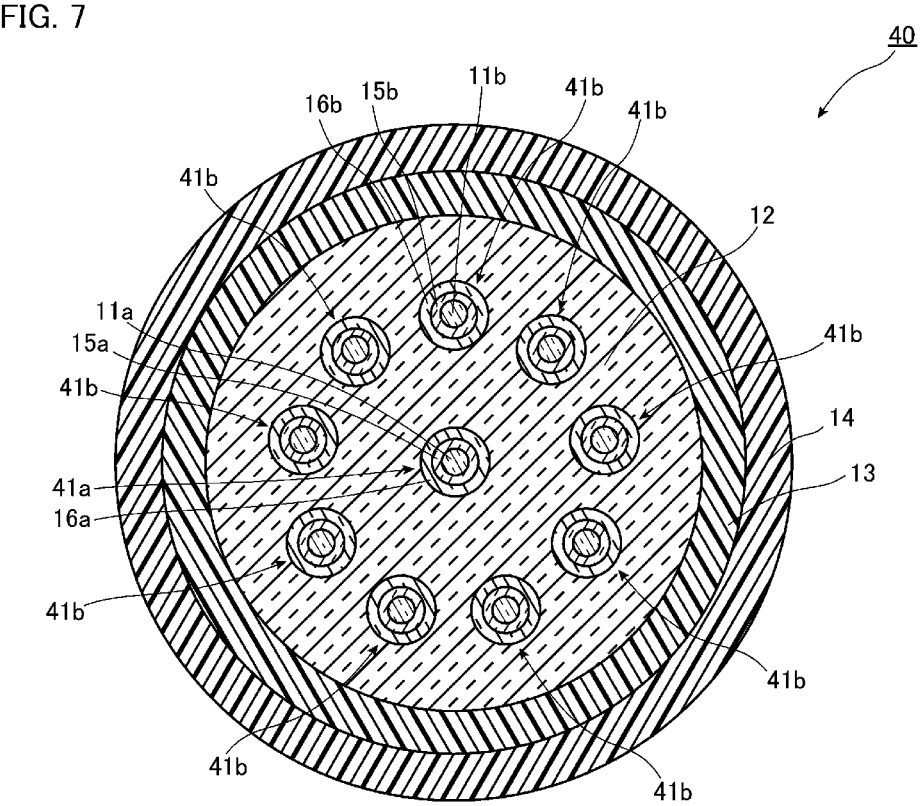
FIG. 7 is a view illustrating a structure of a vertical cross section of a multicore fiber for communication in a longitudinal direction according to a fourth embodiment of the present invention.

FIG. 7 is a view illustrating a state of the multicore fiber according to the fourth embodiment of the present invention. As illustrated in FIG. 7, a multicore fiber 40 according to the present embodiment differs from a multicore fiber 10 according to the first embodiment in that a plurality of cores 11a and 11b in the multicore fiber 10 according to the first embodiment is surrounded by inner clad layers 15a and 15b without gaps and, further, the inner clad layers 15a and 15b are surrounded by the respective low refractive index layers 16a and 16b. In the present embodiment, the cores 11a and 11b, the inner clad layers 15a and 15b and the low refractive index layers 16a and 16b form core elements 41a and 41b.

The outer diameters of the inner clad layers 15a and 15b are mutually equal, and the outer diameters of the respective low refractive index layers 16a and 16b are mutually equal. Hence, the thicknesses of the respective inner clad layers 15a and 15b are mutually equal, and the thicknesses of respective the low refractive index layers 16a and 16b are mutually equal.

Meanwhile, refractive indices $n_5$ of the respective inner clad layers 15a and 15b and the refractive index $n_2$ of the clad 12 are lower than the refractive indices $n_1$ of the respective cores 11a and 11b, and the refractive indices $n_6$ of the low refractive index layers 16a and 16b are lower than the refractive indices $n_5$ of the inner clad layers 15a and 15b and the refractive index $n_2$ of the clad 12. In other words, the respective refractive indices $n_1$, $n_2$, $n_5$ and $n_6$ all satisfy $n_1 > n_5 > n_6$, $n_1 > n_2$ and $n_6 < n_2$.

Further, in the present embodiment, the refractive indices $n_5$ of the inner clad layers 15a and 15b and the refractive index $n_2$ of the clad 12 are mutually equal. That is, $n_5 = n_2$ is true.

From the view point of the refractive indices of the respective core elements 41a and 41b, the low refractive index layers 16a and 16b have low shapes like trenches in the respective core elements 41a and 41b, and the core elements 41a and 41b adopt the trench structures. In addition, in the present embodiment, the refractive indices of the respective low refractive index layers 16a and 16b are uniform in the respective low refractive index layers 16a and 16b, and the refractive indices of the respective low refractive index layers 16a and 16b and the average refractive index means the same.

In addition, the inner clad layers 15a and 15b have the refractive indices equal to the clad 12 as described above, and therefore is formed using, for example, the same material as that of the clad 12. Further, the low refractive index layers 16a and 16b are made of silica glass doped with a dopant which decreases the refractive indices. Such a dopant is, for example, fluorine.

In the respective core elements 41a and 41b of this multicore fiber 40, the refractive indices $n_6$ of the low refractive index layers 16a and 16b are lower than the refractive indices $n_5$ of the inner clad layers 15a and 15b and the refractive index $n_2$ of the clad 12, so that an effect of light confinement in the cores 11a and 11b increases and light hardly leaks from the cores 11a and 11b. Consequently, it is possible to prevent light propagating in the cores 11a and 11b from leaking from the core elements 41a and 41b. Further, the low refractive index layers 16a and 16b and the clad 12 having the low refractive indices serve as barriers, so that it is possible to prevent crosstalk between the cores 11a and 11b in the mutually neighboring core elements.

Hereinafter, an example of the property according to the present embodiment will be described. In this multicore fiber 40, the cladding diameter is 204.4 μm, the distances between the centers of the center core 11a and outer periphery side cores 11b are 59.2 μm, the distances between the outer periphery side cores 11b are 40.5 μm, the distances between the centers of the outer periphery side cores 11b and the outer peripheral surface of the clad 12 are 43 μm, the thicknesses of the inner clad layers 15a and 15b are 6.0 μm respectively, the thicknesses of the low refractive index layers 16a and 16b are 4.3 μm, the relative refractive index difference of the center core is 0.23% and the relative refractive index differences of the low refractive index layers are −0.65%.

In this multicore fiber 40, when an optical signal having a wavelength in a 1.55 μm band propagates in the cores 11a and 11b, an effective cross-sectional area Aeff of the center core 11a is 116.04 μm², a cutoff wavelength is 1.25 μm, the effective cross-sectional areas Aeff of the outer periphery side cores 11b are 118.2 μm² to 125.2 μm², and cutoff wavelengths are 1.28 μm to 1.39 μm. Further, crosstalk between the outer periphery side cores 11b when a measurement length is 3.96 km is −38.6 dB to −41.6 dB, and crosstalk between the center core 11a and the outer periphery side cores 11b is −71.7 to −75.2 dB.

Fifth Embodiment

Next, referring to FIG. 8, a fifth embodiment of the present invention will be described in detail. In addition, components that are identical or similar to those in the fourth embodiment will be denoted by the same reference numerals as those used in the fourth embodiment unless particularly described, and will not be described.

Figure 8:
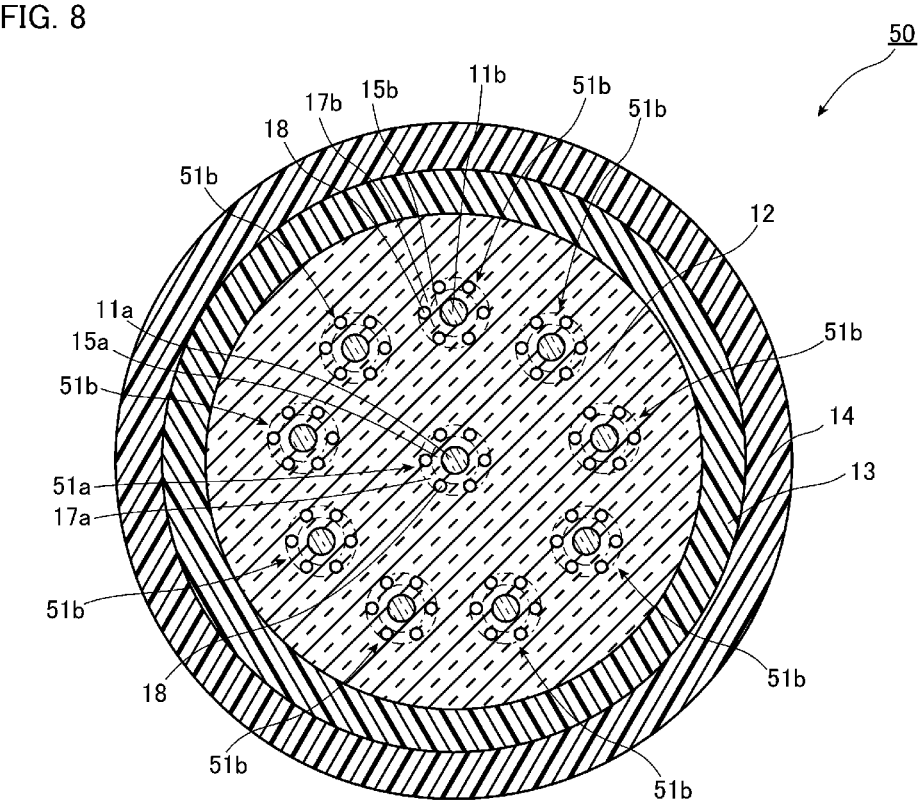
FIG. 8 is a view illustrating a structure of a vertical cross section of a multicore fiber for communication in a longitudinal direction according to a fifth embodiment of the present invention.

FIG. 8 is a view illustrating a structure of a vertical cross section of a multicore fiber in a longitudinal direction according to the fifth embodiment of the present invention. As illustrated in FIG. 8, a multicore fiber 50 according to the present embodiment differs from a multicore fiber 40 according to the fourth embodiment in that, instead of respective core elements 41a and 41b according to the fourth embodiment, core elements 51a and 51b arranged at the same spots as those of the respective core elements 41a and 41b are arranged. More specifically, in the respective core elements 51a and 51b, low refractive index layers 17a and 17b are arranged instead of low refractive index layers 16a and 16b according to the fourth embodiment.

In the respective low refractive index layers 17a and 17b, a plurality of low refractive index portions 18 which have lower refractive indices than those of the clad 12 and the inner clad layers 15a and 15b are formed surrounding the inner clad layers 15a and 15b. In the present embodiment, a plurality of circular holes is formed in the low refractive index layers 17a and 17b, and these holes are the low refractive index portions 18. Hence, the shape in the cross section of the low refractive index portion 18 is circular. In the present embodiment, the cores 11a and 11b, the inner clad layers 15a and 15b and the low refractive index layers 17a and 17b form core elements 51a and 51b.

Further, in the present embodiment, an area other than the low refractive index portions 18 in the respective low refractive index layer 17a and 17b is made of the same material as those of the clad 12 and the inner clad layers 15a and 15b. Furthermore, the low refractive index portions 18 are holes, and the refractive indices of the low refractive index portions 18 are 1 and are lower than the refractive indices of the inner clad layers 15a and 15b and the clad 12 and the average refractive index of the low refractive index layers 17a and 17b is lower than those of the inner clad layers 15a and 15b and the clad 12.

In the multicore fiber 50 according to the present embodiment, the low refractive index portions 18 which have low refractive indices are not continuously annularly formed surrounding the respective cores 11a and 11b, so that it is possible to allow a higher mode to adequately escape from the respective cores 11a and 11b. Consequently, it is possible to prevent the cutoff wavelengths of the cores 11a and 11b from becoming long.

Further, the low refractive index portions 18 are holes, so that it is possible to make the refractive index of the low refractive index layers 17a and 17b lower, and further reduce crosstalk between the respective cores 11a and 11b while preventing the respective cores 11a and 11b from intensifying confinement of a higher mode.

In addition, although, in the present embodiment, the low refractive index portions 18 are formed as holes and, consequently, it is possible to make the refractive indices of the low refractive index portions 18 smaller, the low refractive index portions 18 are not limited to holes, and the material is not limited in particular as long as the material has a lower refractive index than those of the inner clad layers 15a and 15b and the clad 12. For example, the low refractive index portions 18 may be formed using silica doped with a dopant such as fluorine which decreases the refractive index. Even in this case, it is possible to reduce the number of silica doped with fluorine which is costly in the multicore fiber 50 according to the present embodiment, and manufacture the multicore fibers 50 at low cost.

Sixth Embodiment

Next, referring to FIG. 9, a sixth embodiment of the invention will be described in detail. In addition, components that are identical or similar to those in the first embodiment will be denoted by the same reference numerals as those used in the first embodiment unless particularly described, and will not be described.

Figure 9:
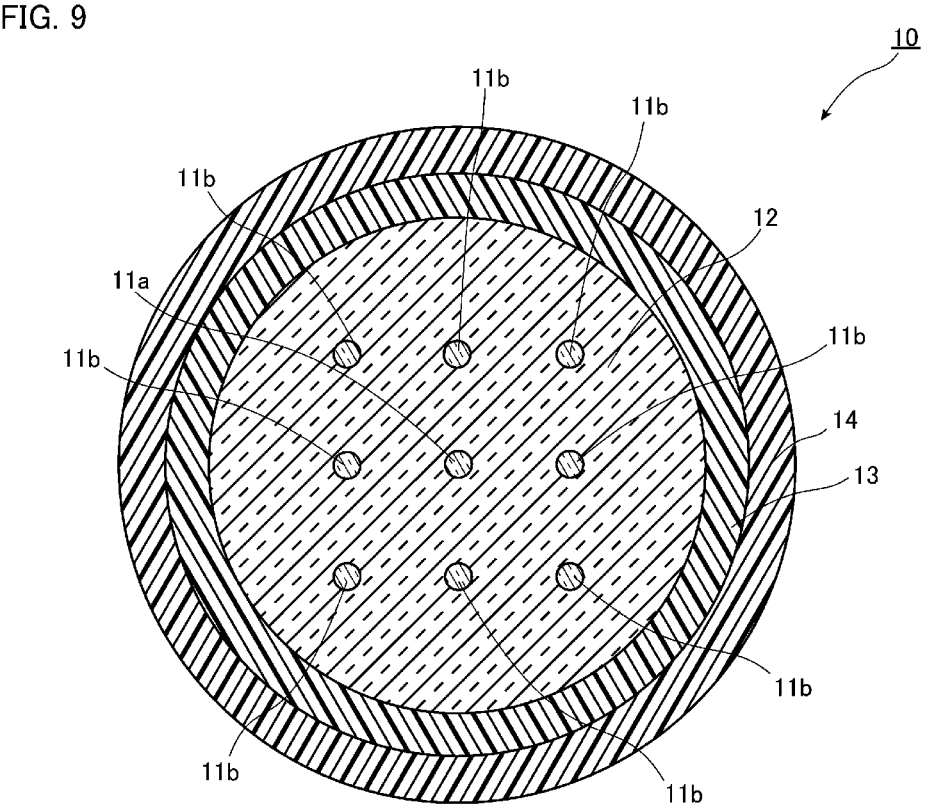
FIG. 9 is a view illustrating a structure of a vertical cross section of a multicore fiber for communication in a longitudinal direction according to a six embodiment of the present invention.

FIG. 9 is a view illustrating a structure of a vertical cross section of a multicore fiber in a longitudinal direction according to the six embodiment of the present invention. As illustrated in FIG. 6, a multicore fiber 60 according to the present embodiment differs from a multicore fiber 10 according to the first embodiment in the number and an arrangement of cores 11b. More specifically, a core 11a arranged in a center of a clad 12 is surrounded by eight cores 11b, and these eight cores 11b are arranged at equal intervals to form a square as a whole.

The multicore fiber 60 according to the present embodiment is an optical fiber which allows propagation of an optical signal similar to the multicore fiber 10 according to the first embodiment, and the mode field diameter of light propagating in the cores 11a and 11b is preferably 9 μm to 13 μm for the same reason as for the multicore fiber 10 according to the first embodiment.

Further, for the same reason as for the multicore fiber 10 according to the first embodiment, distances between centers of the cores 11a and 11b are preferably 30 μm or more and, more preferably, 40 μm or more. Furthermore, for the same reason as for the multicore fiber 10 according to the first embodiment, distances between the centers of the outer periphery side cores 11b and the outer periphery side of the clad 12 are also preferably 35 μm or more and, more preferably, 40 μm or more.

In the present embodiment, when the distances between the centers of the mutually neighboring cores 11a and 11b are 30 μm or more and the distances between the centers of the cores 11b arranged on the outer periphery side and the outer peripheral surface of the clad 12 are 35 μm or more as described above, the cladding diameter is 155 μm to 230 μm, and, when the distances between the centers of the mutually neighboring cores 11a and 11b are 40 μm or more and the distances between the centers of the cores 11b arranged on the outer periphery side and the outer peripheral surface of the clad 12 are 40 μm or more, the cladding diameter is 194 μm to 230 μm. The reason why the upper limit of the cladding diameter is 230 μm is the same as the reason why the upper limit of the cladding diameter of the multicore fiber 10 according to the first embodiment is 230 μm.

Ten cores are arranged according to the arrangement of the cores 11a and 11b of the multicore fiber 60 according to the present embodiment, so that it is possible to arrange more cores and transmit a greater amount of information than a conventional common multicore fiber in which cores are provided in the 1-6 arrangement.

Seventh Embodiment

Next, referring to FIG. 10, a seventh embodiment of the present invention will be described in detail. In addition, components that are identical or similar to those in the first embodiment will be denoted by the same reference numerals as those used in the first embodiment unless particularly described, and will not be described.

Figure 10:
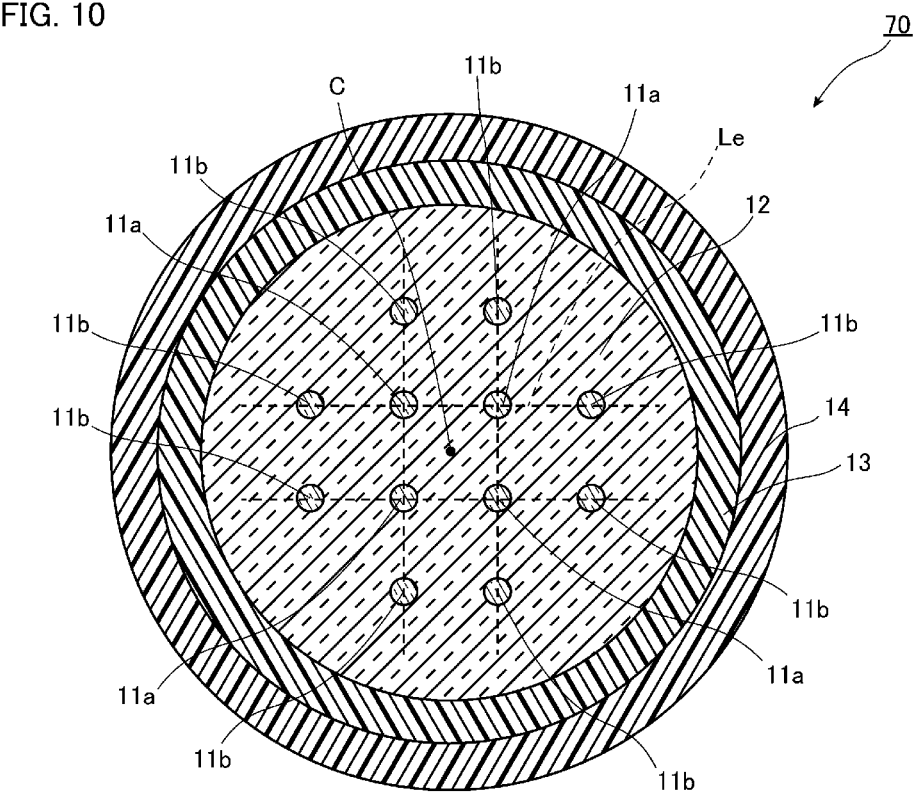
FIG. 10 is a view illustrating a structure of a vertical cross section of a multicore fiber for communication in a longitudinal direction according to a seventh embodiment of the present invention.

FIG. 10 is a view illustrating a structure of a vertical cross section of a multicore fiber in a longitudinal direction according to the seventh embodiment of the present invention. As illustrated in FIG. 10, a multicore fiber 70 according to the present embodiment differs from a multicore fiber 10 according to the first embodiment in the number and an arrangement of cores 11a and 11b. More specifically, the number of cores 11a is four, and the cores 11a are arranged at equal distances from a center C of a clad 12 and at equal intervals. Further, the number of cores 11b which surround these cores 11a is eight, and the cores 11b are arranged one by one respectively, on extended lines Le (indicated by broken lines in FIG. 10) connecting two mutually neighboring cores 11a of the four cores 11a and are arranged such that a distance to the center of the closest core 11 of the four cores 11a is equal to the distances between the centers of the two mutually neighboring cores 11a of the four cores 11a. That is, when the distance between the centers of the two mutually neighboring cores 11a is d, the distance between the centers of the specific core 11b and the core 11a closest to this specific core 11b is also d.

The multicore fiber 70 according to the present embodiment is an optical fiber which allows propagation of an optical signal similar to the multicore fiber 10 according to the first embodiment, and the mode field diameter of light propagating in the cores 11a and 11b is preferably 9 μm to 13 μm for the same reason as for the multicore fiber 10 according to the first embodiment.

Further, for the same reason as for the multicore fiber 10 according to the first embodiment, distances between centers of the respective cores 11a and 11b are preferably 30 μm or more and, more preferably, 40 μm or more. Furthermore, for the same reason as for the multicore fiber 10 according to the first embodiment, distances between the centers of the outer periphery side cores 11b and the outer periphery side of the clad 12 are also preferably 35 μm or more and, more preferably, 40 μm or more.

In the present embodiment, when the distances between the centers of the mutually neighboring cores 11a and 11b are 30 μm or more and the distances between the centers of the cores 11b arranged on the outer periphery side and the outer peripheral surface of the clad 12 are 35 μm or more as described above, the cladding diameter is 165 μm to 230 μm, and, when the distances between the centers of the mutually neighboring cores 11a and 11b are 40 μm or more and the distances between the centers of the cores 11b arranged on the outer periphery side and the outer peripheral surface of the clad 12 are 40 μm or more, the cladding diameter is 207 μm to 230 μm. The reason why the upper limit of the cladding diameter is 230 μm is the same as the reason why the upper limit of the cladding diameter of the multicore fiber 10 according to the first embodiment is 230 μm.

Ten cores are arranged according to the arrangement of the cores 11a and 11b of the multicore fiber 70 according to the present embodiment, so that it is possible to arrange more cores and transmit a greater amount of information than a conventional common multicore fiber in which cores are provided in the 1-6 arrangement.

Although the present invention has been described above by reference to the first to seventh embodiments as examples, the present invention is not limited thereto.

For example, in the first embodiment to the third embodiment, the sixth embodiment and the seventh embodiment, these cores 11a and 11b may be surrounded by inner clad layers and low refractive index layers as in the fourth embodiment and the fifth embodiment.

INDUSTRIAL APPLICABILITY

As describe above, the present invention provides a multicore fiber for communication in which more cores can be arranged under conditions that the multicore fiber for communication can be laid while reliability is secured, and is useful for communication optical fibers for short distance transmission disposed in households and communication optical fibers for long distance transmission such as undersea cables.

REFERENCE SIGNS LIST 10, 20, 30, 40, 50, 60, 70 . . . Multicore fiber
11a, 11b, 11c . . . Core
12 . . . Clad
13 . . . Inner protective layer
14 . . . Outer protective layer
15a, 15b . . . Inner clad layer
16a, 16b, 17a, 17b . . . Low refractive index layer
18 . . . Low refractive index portion
41a, 41b, 51a, 51b . . . Core element

The invention claimed is:

1. A multicore fiber for communication comprising:
   a clad;
   four cores which are each arranged at equal distances from a center of the clad and at equal intervals; and
   eight cores which are arranged on an extended line which connects two mutually neighboring cores of the four cores, and which are arranged such that a distance to a center of a closest core of the four cores is equal to distances between centers of the two mutually neighboring cores of the four cores,
   wherein the clad has a diameter of 230 μm or less,
   wherein:
   a mode field diameter of light propagating in each of the cores is 9 μm to 13 μm; and
   a distance between centers of the cores which are mutually neighboring is 30 μm or more, and a distance between the center of the core and an outer peripheral surface of the clad is 35 μm or more.

2. The multicore fiber for communication according to claim 1, further comprising:
   an inner clad layer which has a lower refractive index than that of the core and which surrounds each core; and
   a low refractive index layer which has a lower average refractive index than those of the clad and the inner clad layer and which surrounds each inner clad layer.

3. The multicore fiber for communication according to claim 2, wherein the low refractive index layer is made of a material having a lower refractive index than those of the clad and the inner clad layer.

4. The multicore fiber for communication according to claim 2, wherein, in the low refractive index layer, a plurality of low refractive index portions which has lower refractive indices than those of the clad and the inner clad layer is formed surrounding the inner clad layer.

5. The for communication multicore fiber for communication according to claim 4, wherein the low refractive index portion is a hole.

6. A multicore fiber for communication comprising:
a clad;
four cores which are each arranged at equal distances from a center of the clad and at equal intervals; and
eight cores which are arranged on an extended line which connects two mutually neighboring cores of the four cores, and which are arranged such that a distance to a center of a closest core of the four cores is equal to distances between centers of the two mutually neighboring cores of the four cores,
wherein the clad has a diameter of 230 μm or less
wherein the multicore fiber further comprises:
an inner clad layer which has a lower refractive index than that of the core and which surrounds each core; and
a low refractive index layer which has a lower average refractive index than those of the clad and the inner clad layer and which surrounds each inner clad layer, and
wherein the low refractive index layer is made of a material having a lower refractive index than those of the clad and the inner clad layer.

7. A multicore fiber for communication comprising:
a clad;
four cores which are each arranged at equal distances from a center of the clad and at equal intervals; and
eight cores which are arranged on an extended line which connects two mutually neighboring cores of the four cores, and which are arranged such that a distance to a center of a closest core of the four cores is equal to distances between centers of the two mutually neighboring cores of the four cores,
wherein the clad has a diameter of 230 μm or less
wherein the multicore fiber further comprises:
an inner clad layer which has a lower refractive index than that of the core and which surrounds each core; and
a low refractive index layer which has a lower average refractive index than those of the clad and the inner clad layer and which surrounds each inner clad layer, and
wherein, in the low refractive index layer, a plurality of low refractive index portions which has lower refractive indices than those of the clad and the inner clad layer is formed surrounding the inner clad layer.

8. The for communication multicore fiber for communication according to claim 7, wherein the low refractive index portion is a hole.

* * * * *